(12) United States Patent
Seo et al.

(10) Patent No.: US 12,105,814 B2
(45) Date of Patent: Oct. 1, 2024

(54) ELECTRONIC DEVICE FOR PROVIDING PRIVACY SERVICES

(71) Applicant: SAMSUNG ELECTRONICS CO., LTD., Suwon-si (KR)

(72) Inventors: Dongwook Seo, Suwon-si (KR); Moonkyung Kim, Suwon-si (KR); Myeongjin Oh, Suwon-si (KR); Seyeong Lee, Suwon-si (KR); Yeongsu Lee, Suwon-si (KR); Yeonggeun Choe, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 352 days.

(21) Appl. No.: 17/571,046

(22) Filed: Jan. 7, 2022

(65) Prior Publication Data
US 2022/0188429 A1 Jun. 16, 2022

Related U.S. Application Data

(63) Continuation of application No. PCT/KR2021/017366, filed on Nov. 24, 2021.

(30) Foreign Application Priority Data

Dec. 11, 2020 (KR) .................. 10-2020-0173534

(51) Int. Cl.
*G06F 21/60* (2013.01)
*G06F 21/31* (2013.01)
*G06F 21/62* (2013.01)

(52) U.S. Cl.
CPC ............ *G06F 21/604* (2013.01); *G06F 21/31* (2013.01); *G06F 21/6227* (2013.01); *G06F 21/6245* (2013.01)

(58) Field of Classification Search
CPC .... G06F 21/604; G06F 21/31; G06F 21/6227; G06F 21/6245

(Continued)

(56) References Cited

U.S. PATENT DOCUMENTS 9,026,952 B2 * 5/2015 Howell ............... G06F 21/6245
715/977
9,152,819 B2 * 10/2015 Poornachandran ..... H04L 63/20
(Continued)

FOREIGN PATENT DOCUMENTS

KR         10-0987157         10/2010
KR       10-2013-0023656       3/2013
(Continued)

OTHER PUBLICATIONS

Search Report and Written Opinion issued Feb. 25, 2022 in counterpart International Patent Application No. PCT/KR2021/017366 and English-language translation.

*Primary Examiner* — Michael S McNally
(74) *Attorney, Agent, or Firm* — Nixon & Vanderhye, P.C.

(57) ABSTRACT

According to various embodiments, an electronic device may include: a touch-sensitive display; a processor operatively connected to the display; and a memory operatively connected to the processor, wherein the memory may store instructions that, when executed, cause the processor to: control the display to provide a right setup screen that enables a user to select data which an application is allowed to access among data stored in the memory, receive a read request for the data stored in the memory from the application, select data to be provided to the application among the data stored in the memory based on an access right policy (Continued)

established using the right setup screen, and provide the selected data to the application in response to the read request.

16 Claims, 11 Drawing Sheets

(58) Field of Classification Search
USPC .......................................................... 726/26
See application file for complete search history.

(56) References Cited

U.S. PATENT DOCUMENTS

| | | | |
|---|---|---|---|
| 9,519,756 | B2 | 12/2016 | Bitran et al. |
| 9,773,102 | B2 | 9/2017 | Graham et al. |
| 11,194,926 | B2 | 12/2021 | Luo et al. |
| 2013/0055378 | A1 | 2/2013 | Chang et al. |
| 2015/0163339 | A1* | 6/2015 | Fenton .................. H04M 19/04 |
| | | | 455/557 |
| 2017/0279609 | A1 | 9/2017 | Cho et al. |
| 2018/0121671 | A1* | 5/2018 | Bhandari ............ G06F 16/1774 |
| 2018/0268163 | A1* | 9/2018 | Ollikainen ............ H04L 63/107 |
| 2019/0065711 | A1 | 2/2019 | Seo et al. |
| 2023/0128244 | A1* | 4/2023 | Jha ...................... G06F 16/3334 |
| | | | 704/9 |

FOREIGN PATENT DOCUMENTS

| | | |
|---|---|---|
| KR | 10-1590626 | 2/2016 |
| KR | 10-2016-0025429 | 3/2016 |
| KR | 10-2019-0021559 | 3/2016 |
| KR | 10-1731312 | 4/2017 |
| KR | 10-1862382 | 6/2018 |
| KR | 10-2185000 | 11/2020 |
| KR | 10-2468268 | 11/2022 |

* cited by examiner

ELECTRONIC DEVICE FOR PROVIDING PRIVACY SERVICES

CROSS-REFERENCE TO RELATED APPLICATIONS

This application is a continuation of International Application No. PCT/KR2021/017366 designating the United States, filed on Nov. 24, 2021, in the Korean Intellectual Property Receiving Office and claiming priority to Korean Patent Application No. 10-2020-0173534, filed on Dec. 11, 2020, in the Korean Intellectual Property Office, the disclosures of which are incorporated by reference herein in their entireties.

BACKGROUND

Field

The disclosure relates to an electronic device configured to provide a privacy service of giving a right to access data to an application and withdrawing the given right.

Description of Related Art

Whether to give an application-declared right (e.g., a right to read a message) to an application can be determined by a user. For example, an electronic device may inquire of a user whether to give a right to an application through a pop-up. When the user responds with permission, the electronic device may give a right to access data to the application. The electronic device may provide a setup menu for giving or withdrawing a right through the display. The electronic device may give a declared right to the application or may withdraw a given right according to a user input through the setup menu.

An application may be configured to request a right from a user at the time of being installed in an electronic device and to perform an operation expected by the user only when the right is given. Giving the right may be an indispensable element for the expected operation rather than an option from the user's perspective.

However, the application may not only perform the expected operation but may also perform an operation (e.g., an ill-intentioned operation) that the user does not want. For example, a problem in which a message requiring the user's privacy, such as a conversation between family members, is transmitted to somewhere outside the electronic device may occur.

SUMMARY

Embodiments of the disclosure provide an electronic device configured to selectively allow an application to access data even though providing a right to access the data for the application, thereby protecting important data and preventing and/or reducing an ill-intentioned operation. Data that can be commonly accessed by applications installed in the electronic device may include a message (e.g., a chat (or instant) message, a social networking service (SNS) message, a multimedia messaging service (MMS) message, or a short messaging service (SMS) message). In addition, the data that can be commonly accessed may include a picture or a video.

Technical aspects to be achieved in the disclosure are not limited to the technical aspects mentioned above, and other technical aspects not mentioned will be clearly understood by those skilled in the art from the following description.

According to various example embodiments, an electronic device may include: a touch-sensitive display; a processor operatively connected to the display; and a memory operatively connected to the processor, wherein the memory may store instructions that, when executed, cause the processor to: control the display to provide a right setup screen that enables a user to select data which an application is allowed to access among data stored in the memory, receive a read request for the data stored in the memory from the application, select data to be provided to the application among the data stored in the memory based on an access right policy established using the right setup screen, and provide the selected data to the application in response to the read request.

According to various example embodiments, a method for operating an electronic device may include: providing a right setup screen that enables a user to select data which an application is allowed to access among data stored in a memory of the electronic device through a display of the electronic device, receiving a read request for the data stored in the memory from the application, selecting data to be provided to the application among the data stored in the memory, based on an access right policy established using the right setup screen, and providing the selected data to the application in response to the read request.

According to various example embodiments, a non-transitory computer-readable recording medium may store instructions readable by a processor of an electronic device, wherein the instructions may, when executed by the processor, cause the processor to perform operations comprising: providing a right setup screen that enables a user to select data which an application is allowed to access among data stored in a memory of the electronic device through a display of the electronic device; receiving a read request for the data stored in the memory from the application; selecting data to be provided to the application among the data stored in the memory, based on an access right policy established using the right setup screen; and providing the selected data to the application in response to the read request.

Privacy can be understood as the right to selectively disclose information about an individual or a group to others. According to various example embodiments of the disclosure, it is possible to prevent and/or reduce ill-intentioned applications from indiscriminately reading user information by allowing access to only user-desired part of user information and blocking contact information or messages of important people, such as family and friends.

In an era in which privacy is increasingly important, the effect of the disclosure can be expected to increase. In addition, various effects directly or indirectly identified through this document may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
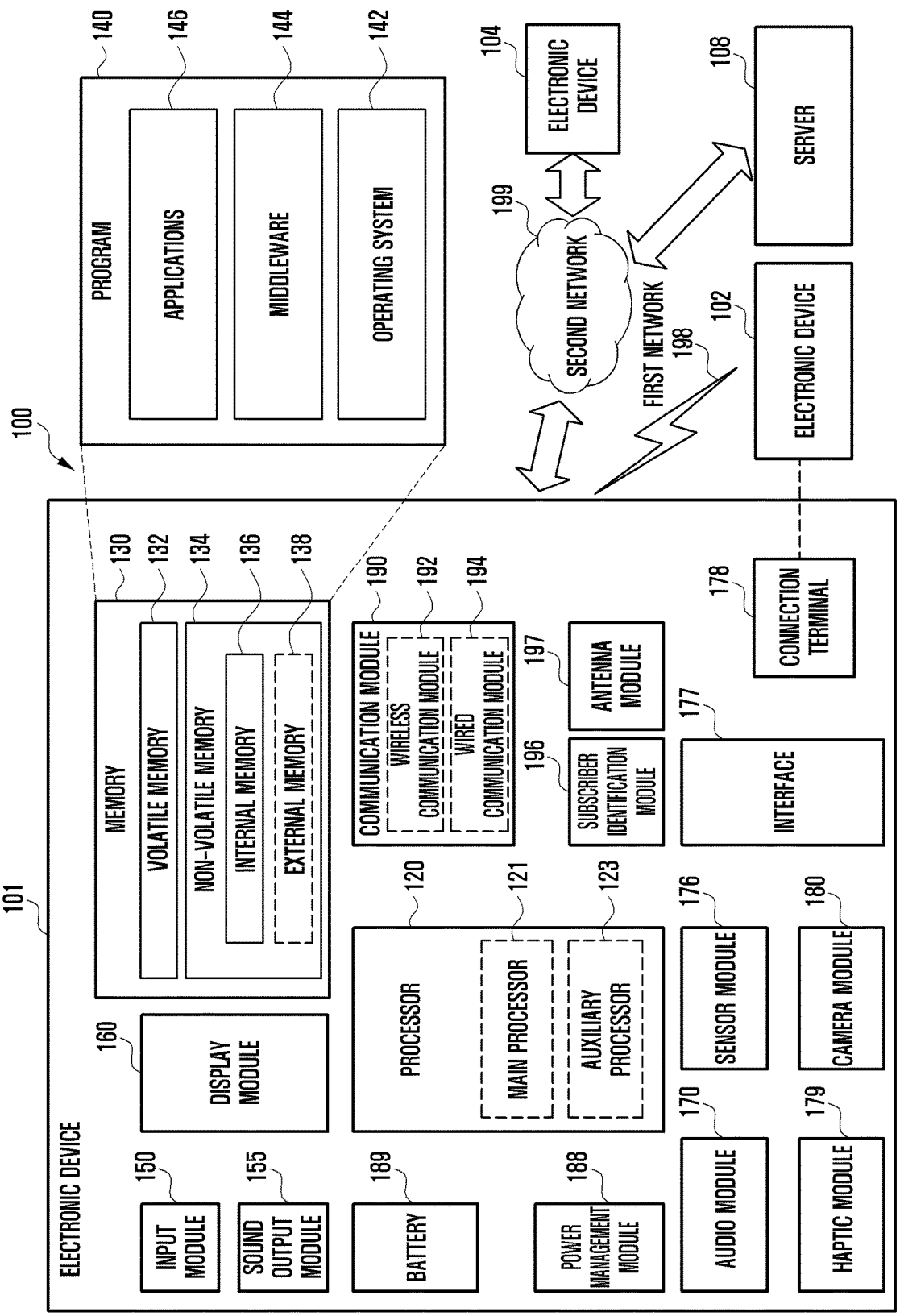
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
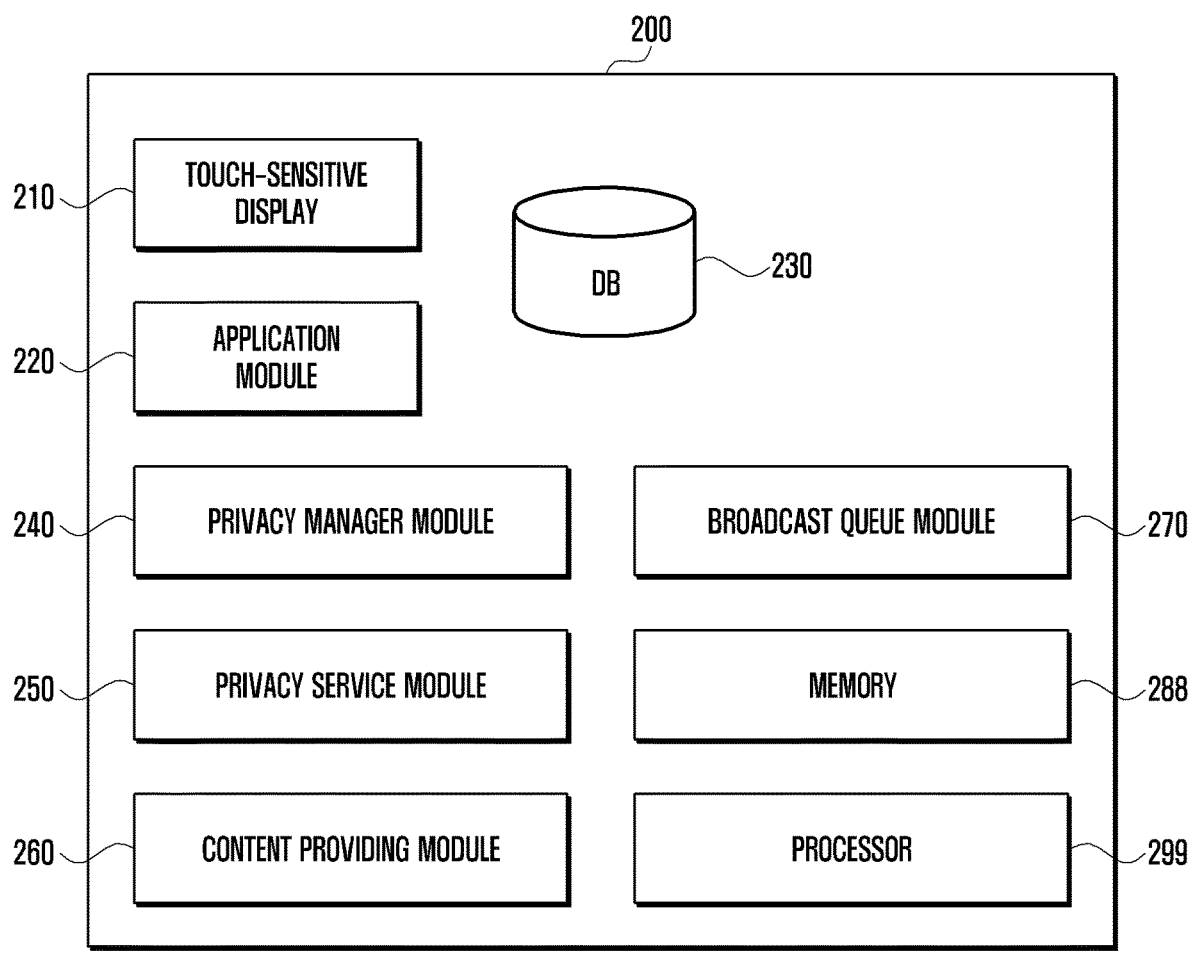
FIG. 2 is a block diagram illustrating an example configuration of an electronic device configured to establish a right to access data for each application according to various embodiments.
Figure 3:
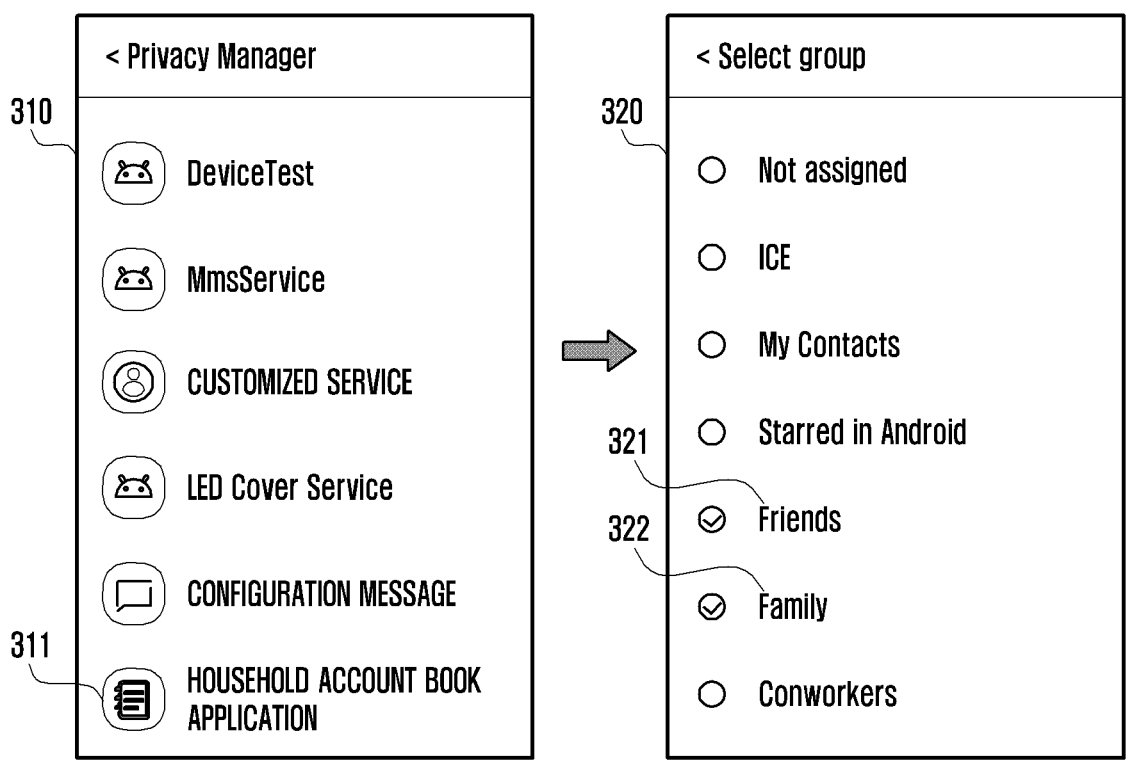
FIG. 3 is a diagram illustrating an example screen for configuring a right of access according to various embodiments.

FIG. 2 is a block diagram illustrating an example configuration of an electronic device 200 configured to establish a right to access data for each application according to various embodiments. FIG. 3 is a diagram illustrating example screens for configuring a right of access according to various embodiments. Referring to FIG. 2, the electronic device 200 (e.g., the electronic device 101 of FIG. 1) may include a touch-sensitive display (hereinafter, referred to as a display) 210 (e.g., the display module 160 of FIG. 1), an application module (e.g., including an application) 220, a database (DB) 230, a privacy manager module (e.g., including various processing circuitry and/or executable program instructions) 240, a privacy service module (e.g., including various processing circuitry and/or executable program instructions) 250, a content providing module (e.g., including various processing circuitry and/or executable program instructions) 260, a broadcast queue module (e.g., including various processing circuitry and/or executable program instructions) 270, a memory 288, and/or a processor (e.g., including processing circuitry) 299. The foregoing components of the electronic device 200 may be functionally or electrically connected to each other.

The application module 220 (e.g., the application 146 of FIG. 1) may be configured with an application embedded at the time of manufacture and/or applications distributed online (e.g., in an application store) or in a form of a storage medium. For example, the application module 230 may include a message application (e.g., a social networking service (SNS) application, a chatting application), a camera application, a health application, an application supporting an online service (e.g., Internet banking), a household account book application that collects card statement information from messages stored in the DB 230 and provides the card statement information to a user, an application that determines whether a message received by the electronic device 200 from an external device through a communication module (e.g., the communication module 190 of FIG. 1) and stored in the DB 230 is a spam message, a delivery service application that collects delivery-related information among messages received by the electronic device 200 from the external device through the communication module and stored in the DB 230, a notification application that notifies the user that the electronic device 200 receives a message (e.g., an SMS message, an MMS message, an SNS message, a chatting message, or a software update message) from the external device through the communication module, etc.

The DB 230 may store data (e.g., a message, a picture, or a video file) generated by the application module 220 using a different component (e.g., a camera, a microphone, a sensor, or a touch screen) of the electronic device 200. The DB 230 may store data (e.g., a message, a picture, or a video file) received by the electronic device 200 from the external device through the communication module. Among the components of the electronic device 200, only a designated component (e.g., the content providing module 260 or the broadcast queue module 270) may be allowed to directly access the DB 230. For example, at least one application of the application module 220 may read the data stored in the DB 230 through the content providing module 260 or the broadcast queue module 270.

The privacy manager module 240 may include various processing circuitry and/or executable program instructions and establish a different access policy on the data stored in the DB 230 for each application by interacting with the user through an input/output device (e.g., the touch-sensitive display 210). For example, the privacy manager module 240 may provide the user with a right setup screen that enables the user to differently configure data allowed to be accessed for each application on the display 210. The privacy manager module 240 may provide an access policy defined by the user through the right setup screen to the privacy service module 250.

According to an embodiment, the privacy manager module 240 may provide UI elements (e.g., icons) representing a plurality of contact groups (e.g., family, friends, and coworkers) through the right setup screen and may establish a policy of the privacy service module 250 allowing or blocking access of an application to a message transmitted to contact information belonging to a group selected by the user through the right setup screen and/or a message received from contact information belonging to the selected group. Referring to FIG. 3, the privacy manager module 240 may provide an application list 310 to the user through the display 210 (refer to FIG. 3). For example, the privacy manager module 240 may provide the user with the application list 310 including applications having a right to access the DB 230. The user may select an application of which reliability is uncertain or for which it is determined that there is no need to display a designated message from the application list 310. Referring to FIG. 3, when an application is selected by the user from the application list 310 (e.g., when a UI element 311 corresponding to the household account book application is touched), the privacy manager module 240 may provide a contact group list 320 to the user through the display 210. The privacy manager module 240 may establish a policy of blocking (or allowing) access of the selected application to a message belonging to a group (e.g., friends 321 or family 322) selected by the user from the contact group list 320.

According to an embodiment, the privacy manager module 240 may establish a policy of the privacy service module 250 allowing or blocking access of an application to a message including a character string (or text) designated by the user. For example, the privacy manager module 240 may provide an application list to the user through the display 210. When an application is selected by the user from the application list, the privacy manager module 240 may provide a right setup screen through the display 210. For example, the privacy manager module 240 may provide the right setup screen including a key pad and an input field for displaying a character string (e.g., 00 card or lump-sum payment) input through the keypad through the display 210. In another example, the privacy manager module 240 may provide the right setup screen including a character string candidate list and an input field for displaying a character string selected from the character string candidate list through the display 210. The privacy manager module 240 may establish a policy of allowing or blocking access of an application to a message including a character string configured through the right setup screen. For example, when a character string including a term indicating a card company and/or a number indicating a payment (or transfer) amount in a message, the privacy manager module 240 may establish a policy of allowing access of the household account book application to this message.

According to an embodiment, when a character string (e.g., information that the user is reluctant to disclose, such as a user name or a social security number) selected by the user is included in a message, the privacy manager module 240 may establish a policy of converting the character string into a designated character string (e.g., ***) and transmitting the message to an application (e.g., the application selected from the application list) selected by the user.

The privacy service module 250 may provide a privacy service to the content providing module 260 and the broadcast queue module 270, based on an access right policy established by the privacy manager module 240. For example, the privacy service module 250 may receive a query about the range of data allowed to be accessed by an application from the content providing module 260. The privacy service module 250 may provide a result value to the content providing module 260 in response to the query (e.g., including a package name for identifying the application). For example, the privacy service module 250 may provide an access right policy (e.g., of blocking access of the household account book application to a message received from contact information belonging to the friends 321 or family 322 and a message transmitted to the contact information) on the application as the result value to the content providing module 260. The broadcast queue module 270 may recognize that a new message is stored in the DB 230 and accordingly may request a list of applications configured to be allowed to access the new message from the privacy service module 250. In response to the request, the privacy service module 250 may identify an access right policy established for each application, may make an application list based on the access right policy, and may transmit the application list to the broadcast queue module 270. For example, when the new message is a message received from contact information belonging to the friends 321 or family 322 or a message transmitted to the contact information belonging to the groups 321 and 322, an application (e.g., the household account book application) configured to be prevented from accessing the message of the contact information according to an access right policy may be excluded from the list to be transmitted to the broadcast queue module 270. According to a non-limiting example, only an application configured to be allowed to access the message of the contact information may be included in the list.

The content providing module 260 may include various processing circuitry and/or executable program instructions and receive a request to read data from an application. The content providing module 260 may process the read request from the application, based on an access right policy of the application making the read request.

According to an embodiment, in response to the read request from the application, the content providing module 260 may transmit identification information (e.g., a package name) about the application making the read request to the privacy service module 250. The content providing module 260 may receive an access right policy of the application making the read request from the privacy service module 250 in response to the transmission of the identification information. The content providing module 260 may read data from the DB 230 and may select data to be transmitted to the application from among the read data, based on the access right policy. For example, the content providing module 260 may identify a message that the application making the read request is configured to be prevented (or allowed) from accessing among messages read from the DB 230 in the access right policy of the application. For example, when contact information about the identified message belongs to a contact group designated as a target to be protected from the application making the read request, the content providing module 260 may exclude the identified message from a list of data to be transmitted to the application. When the contact information about the identified message belongs to a contact group designated as a target that does not need to be protected from the application making the read request, the content providing module 260 may include the identified message in the list of data to be transmitted to the application. In another example, when the identified message includes a character string designated as a target to be protected from the application making the read request, the content providing module 260 may exclude the identified message from the list of data to be transmitted to the application. When the identified message includes a character string designated as a target that does not need to be protected from the application making the read request, the content providing module 260 may include the identified message in the list of data to be transmitted to the application.

According to an embodiment, the content providing module 260 may select data to be processed from among the data determined to be transmitted to the application making the read request, based on the access right policy. For example, the content providing module 260 may identify that a character string (e.g., a user name or a social security number) designated as a protection target is included in a message to be transmitted to the application making the read request. The content providing module 260 may change the identified character string to a designated string (e.g., ***) and may then transmit the message to the application.

According to an embodiment, the application making the read request may be an application notified from the broadcast queue module 270. For example, the household account book application may receive, from the broadcast queue module 270, a notification of a message received from contact information that does not belong to the friend 321 or family 322 and may transmit a read request for the message corresponding to the notification to the content providing module 260. In response to the read request, the content providing module 260 may transmit a query as to whether the application has a right to read the message to the privacy service module 250. The content providing module 260 may process the read request according to a result value of the query received from the privacy service module 250. For example, when the result value corresponds to allowance, the content providing module 260 may read the message from the DB 230 and may transmit the message to the application making the read request. When the result value corresponds to blocking, the content providing module 260 may notify the application that reading is not allowed in response to the read request.

The broadcast queue module 270 may include various processing circuitry and/or executable program instruction and select an application to receive a notification of data newly stored in the DB 230 from among the applications, based on the access right policy, and may transmit the notification to the selected application. For example, the broadcast queue module 270 may request a list of applications configured to be allowed (or blocked) to access the data that is a target to be notified from the privacy service module 250. The broadcast queue module 270 may receive the list of applications in response to the request and may transmit the notification to the applications included in the list (or an application other than the applications included in the list).

According to an embodiment, the broadcast queue module 270 may transmit a request message including information (e.g., a contact group name) indicating contact information transmitting a message that is a target to be notified (hereinafter, "target message") (or receiving the target message) to the privacy service module 250. The broadcast queue module 270 may receive an access-allowed application list (or an access-blocked application list) from the privacy service module 250 in response to the request. The broadcast queue module 270 may transmit the notification to an application included in the access-allowed application list. The broadcast queue module 270 may transmit the notification to an application other than an application included in the access-blocked application list.

According to an embodiment, the broadcast queue module 270 may transmit a request message including the target message to the privacy service module 250. The privacy service module 250 may identify that the target message includes a character string designated to allow access of a designated application, may include the designated application in the access-allowed application list, and may transmit the access-allowed application list to the broadcast queue module 270. For example, when a term indicating a card company and/or a number indicating a payment amount is included in the target message, the privacy service module 250 may include the household account book application in the access-allowed application list.

At least one of the modules 220, 240, 250, 260, and 270 may be stored as instructions in the memory 288 (e.g., the memory 130 of FIG. 1) and may be executed by the processor 299 (e.g., the processor 120 of FIG. 1). At least one of the modules 220, 240, 250, 260, and 270 may be executed by a processor (e.g., the coprocessor 123) specializing in supporting a privacy service. The DB 230 may be stored in the memory 288 or may be stored in a separate chip physically separated from the memory 288. The privacy manager module 240 may be configured with an application embedded at the time of manufacture and/or applications distributed online (e.g., in an application store) or in a form of a storage medium. The privacy service module 250, the content providing module 260, and the broadcast queue module 270 may form part of a framework (e.g., the middleware 144 of FIG. 1).

Figure 4:
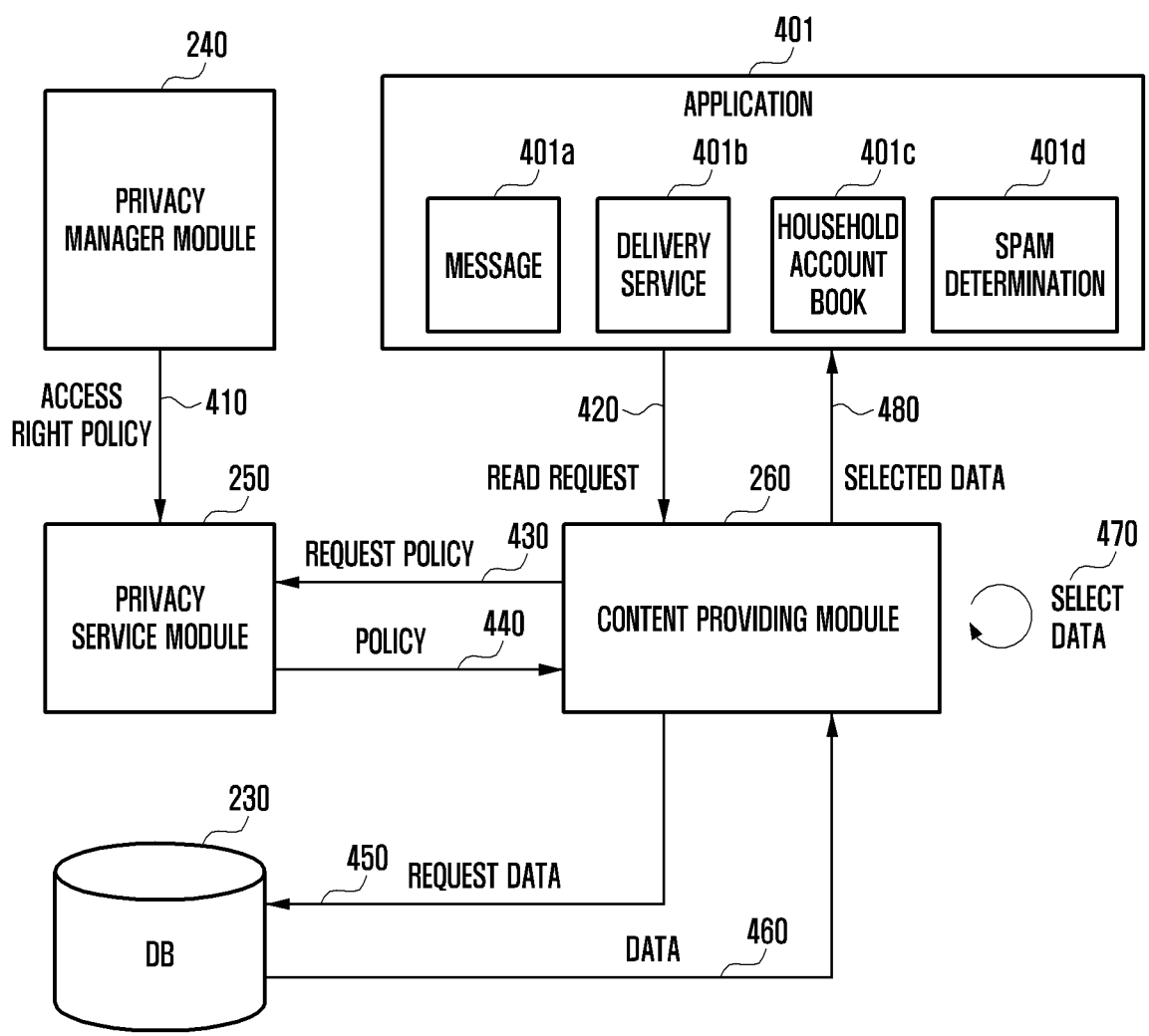
FIG. 4 is a diagram illustrating example operations for processing a read request of an application according to various embodiments.

FIG. 4 is a diagram illustrating example operations for processing a read request of an application according to various embodiments.

In operation 410, the privacy service module 250 may receive an access right policy of an application 401 from the privacy manager module 240.

The application 401 may include a message application 401a embedded when the electronic device 200 is manufactured. The privacy manager module 240 may establish an access right policy of the message application 401a to have a right to access all messages stored in the DB 230.

The application 401 may include a delivery service application 401b. When the delivery service application 401b is installed in the electronic device 200, the privacy manager module 240 may establish an access right policy of the delivery service application 401b such that the delivery service application 401b has a right to access a message including a designated character string (e.g., delivery-related information) among the messages stored in the DB 230.

The application 401 may include a household account book application 401c. When the household account book application 401c is installed in the electronic device 200, the privacy manager module 240 may establish an access right policy of the household account book application 401c such that the household account book application 401c has a right to access a message including a designated character string (e.g., a term indicating a card company and/or a number indicating a payment amount) among the messages stored in the DB 230.

The application 401 may include a spam determination application 401d. When the spam determination application 401d is installed in the electronic device 200, the privacy manager module 240 may establish an access right policy of the spam determination application 401d such that the spam determination application 401d has a right to access a message (e.g., an advertising message related to a loan, a commercial product, or housing sale) from a telephone number not stored in the electronic device 200 among the messages stored in the DB 230. Among the messages from the telephone number not stored in the electronic device 200, a message including information to be protected may be included. For example, a text message related to parcel delivery, payment, or an account transfer may include personal privacy information. Accordingly, when the spam determination application 401d is installed in the electronic device 200, the privacy manager module 240 may establish an access right policy of the spam determination application 401d such that the spam determination application 401d is prevented from accessing a message including a designated character string (e.g., parcel delivery, delivery completion, product, delivery date, recipient, account number, or amount of transferred money).

In operation 420, the content providing module 260 may receive a read request for data (e.g., a read request for the entire SMS message) from the application 401. In operation 430, in response to the read request, the content providing module 260 may transmit a policy request message including identification information (e.g., a package name) about the application 401 to the privacy service module 250. In operation 440, the content providing module 260 may receive, from the privacy service module 250, an access right policy (e.g., a contact group list configured to allow access of the application 401) of the application 401 as a response to the policy request.

In operation 450, the content providing module 260 may request the data that the application 401 makes the request to read from the DB 230. In operation 460, the content providing module 260 may obtain the data from the DB 230 as a response to the request for the data. In operation 470, the content providing module 260 may select data to be transmitted to the application 401 from among the data obtained from the DB 230, based on the access right policy. In operation 480, the content providing module 260 may provide the selected data to the application 401.

Figure 5:
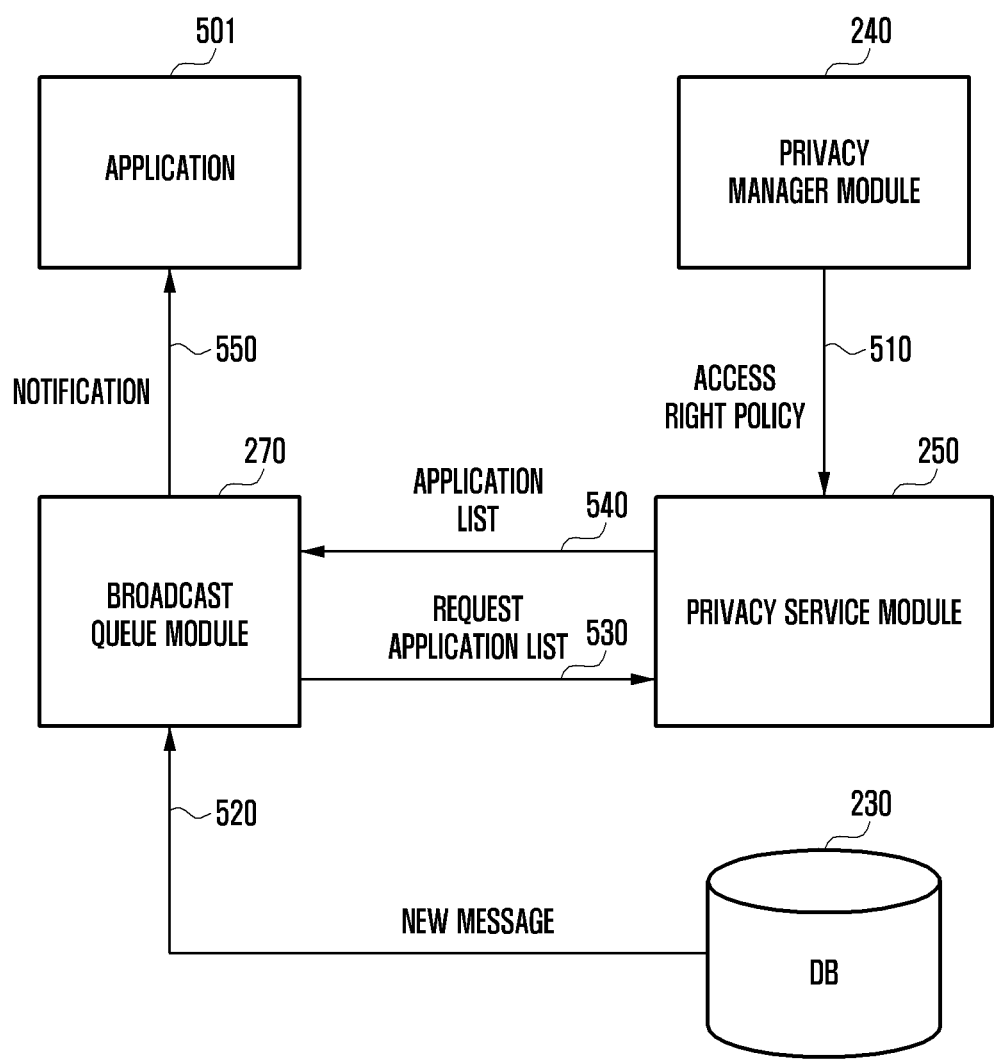
FIG. 5 is a diagram illustrating example operations for processing a notification of a new message according to various embodiments.

FIG. 5 is a diagram illustrating example operations for processing a notification of a new message according to various embodiments.

In operation 510, the privacy service module 250 may receive an access right policy of an application 501 (e.g., the message application 401a, the delivery service application 401b, the household account book application 401c, or the spam determination application 401d) from the privacy manager module 240.

In operation 520, the broadcast queue module 270 may identify a message newly stored in the DB 230 in the DB 230. When the new message is stored in the DB 230, the broadcast queue module 270 may transmit a request message for a list of applications designated to be allowed (or blocked) to access the new message to the privacy service module 250 in operation 530. For example, the request message may include information (e.g., a contact group or a telephone number) about the new message. In operation 540, the broadcast queue module 270 may receive an access-allowed application list (or an access-blocked application list) from the privacy service module 250 as a response to the request for the list.

In operation 550, the broadcast queue module 270 may transmit a notification of the new message to the application 501 included in the access-allowed application list. The broadcast queue module 270 may transmit the notification to the application 501 excluded from the access-blocked application list.

FIG. 6A, FIG. 6B, FIG. 6C, and FIG. 6D are diagrams illustrating example notification operations of the broadcast queue module 270 according to various embodiments.

Figure 6A:
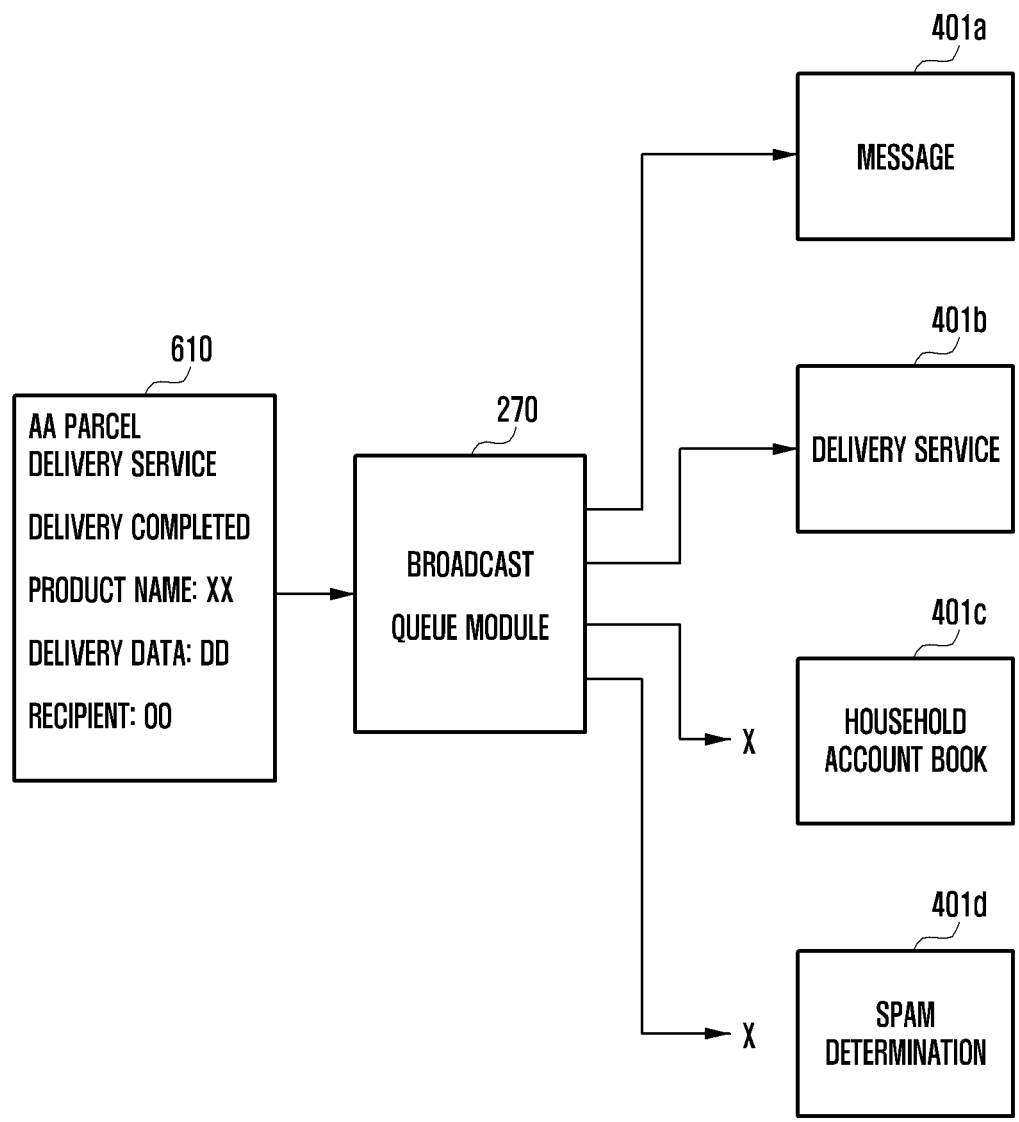
FIG. 6A, FIG. 6B, FIG. 6C, and FIG. 6D are diagrams illustrating example notification operations of a broadcast queue module according to various embodiments.

Referring to FIG. 6A, the broadcast queue module 270 may identify a parcel delivery-related message 610, received by the electronic device 200 from an external device through the communication module, through the DB 230. The broadcast queue module 270 may notify the message application 401a allowed to access all messages and the delivery service application 401b allowed to access the parcel delivery-related message 610 that the message 610 has been received. The household account book application 401c and the spam determination application 401d may not have a right to access the parcel delivery-related message 610 and thus may not recognize that the parcel delivery-related message 610 has been received.

Figure 6B:
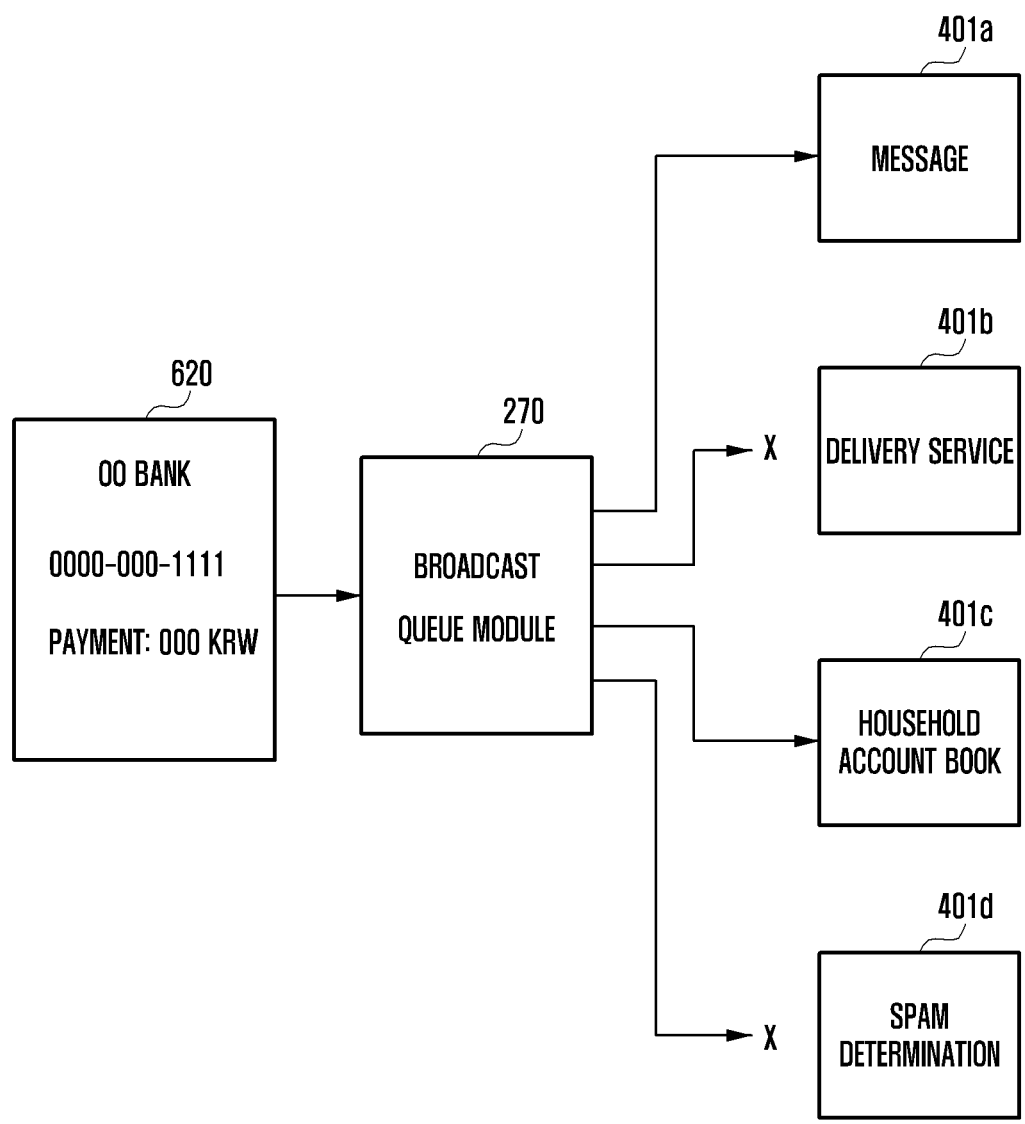

Referring to FIG. 6B, the broadcast queue module 270 may identify an account transfer-related message 620, received by the electronic device 200 from an external device through the communication module, through the DB 230. The broadcast queue module 270 may notify the message application 401a allowed to access all messages and the household account book application 401c allowed to access the account transfer-related message 620 that the message 620 has been received. The delivery service application 401b and the spam determination application 401d may not have a right to access the account transfer-related message 620 and thus may not recognize that the account transfer-related message 620 has been received.

Figure 6C:
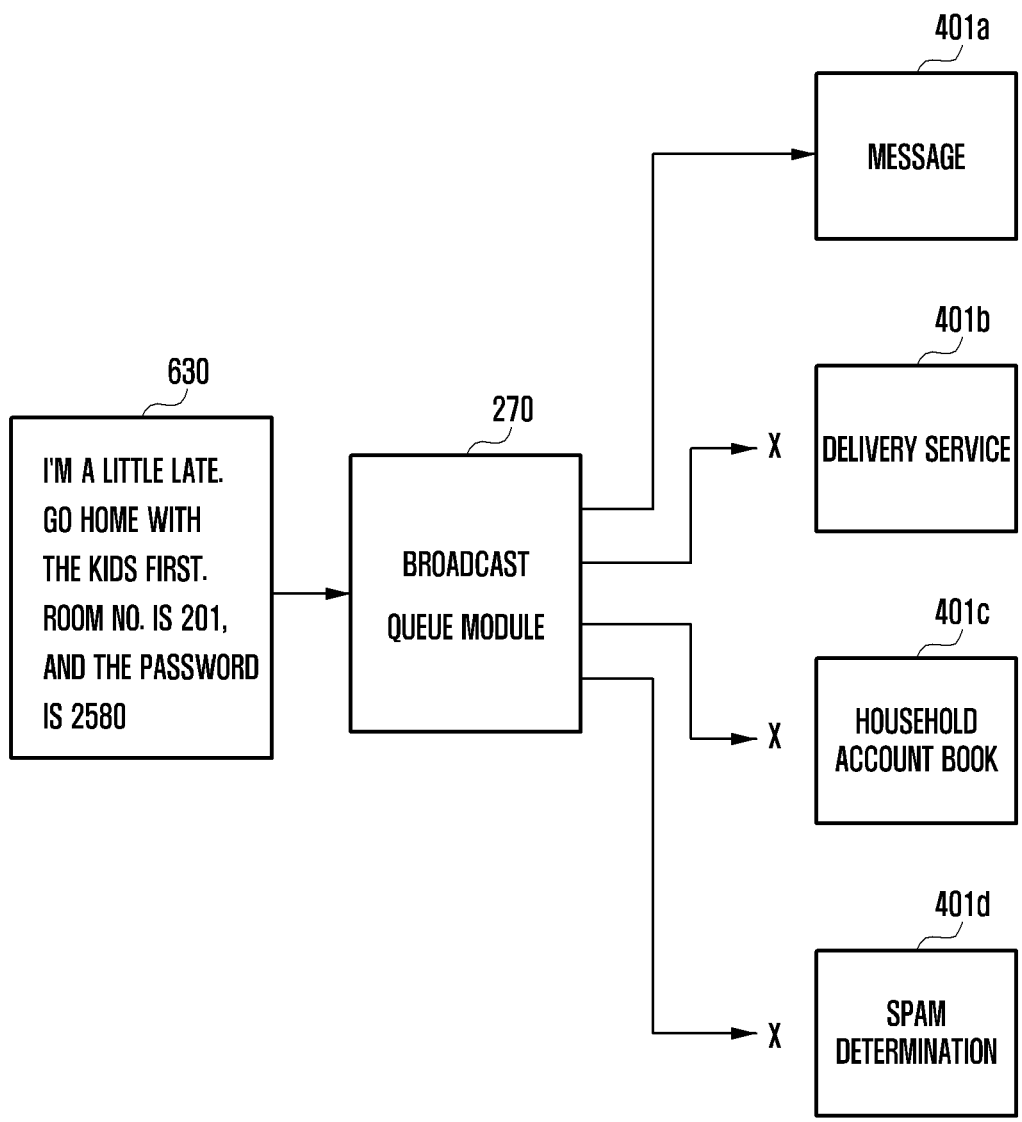

Referring to FIG. 6C, the broadcast queue module 270 may identify a message 630 from contact information belonging to the family group, received by the electronic device 200 from an external device through the communication module, through the DB 230. The broadcast queue module 270 may notify the message application 401a allowed to access all messages that the message 630 has been received. The other applications (e.g., delivery service application 401b, household account book application 401c and spam determination application 401d) may not have a right to access the message 630 from the contact information belonging to the family group and thus may not recognize that the message 630 has been received.

Figure 6D:
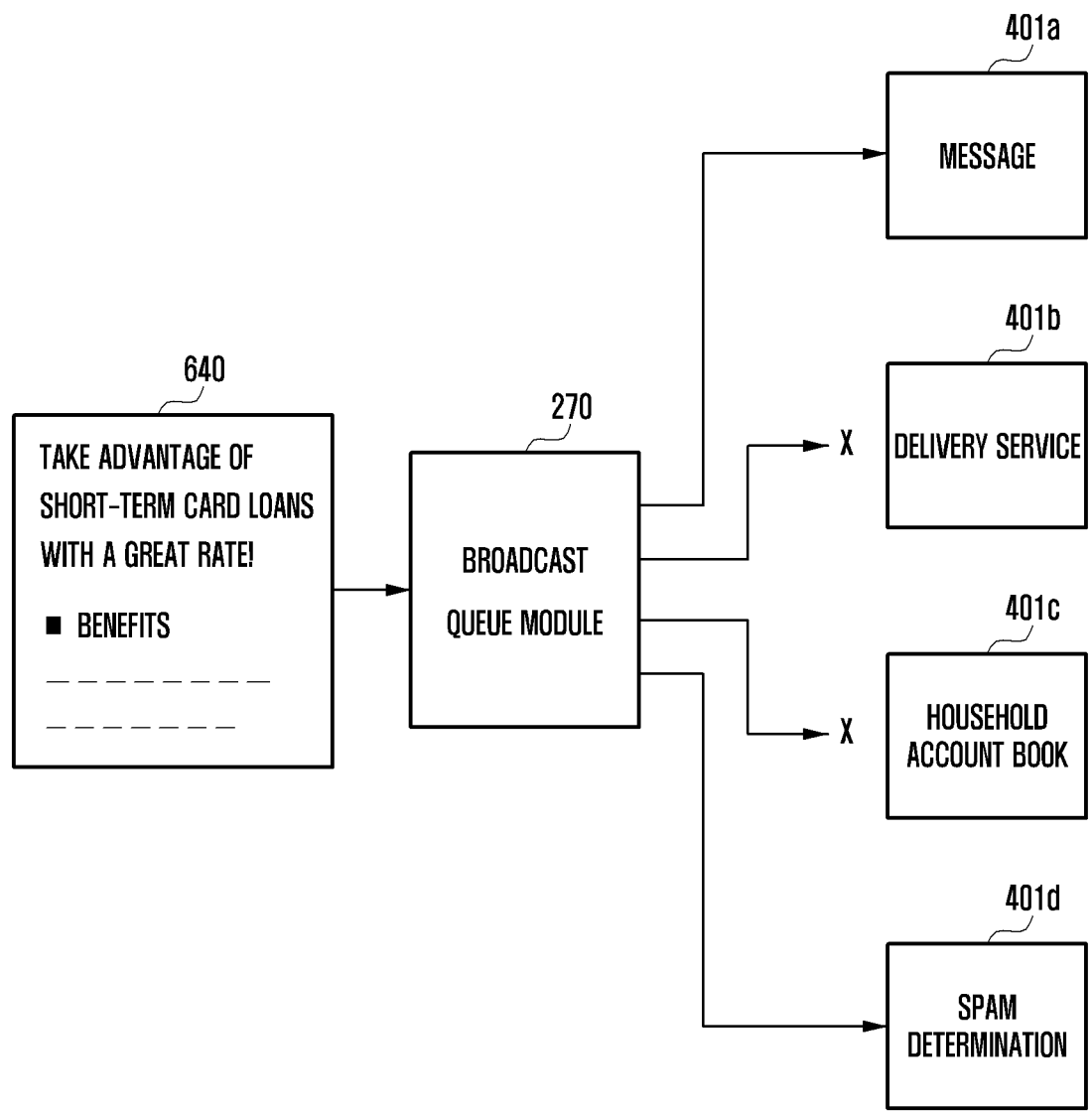

Referring to FIG. 6D, the broadcast queue module 270 may identify an advertising message 640, received by the electronic device 200 from an external device through the communication module, through the DB 230. The broadcast queue module 270 may notify the message application 401a allowed to access all messages and the spam determination application 401d allowed to access the advertising message 640 suspected as a spam message that the message 640 has been received. The delivery service application 401b and the household account book application 401c may not have a right to access the advertising message 640 and thus may not recognize that the advertising message 640 has been received.

Figure 7:
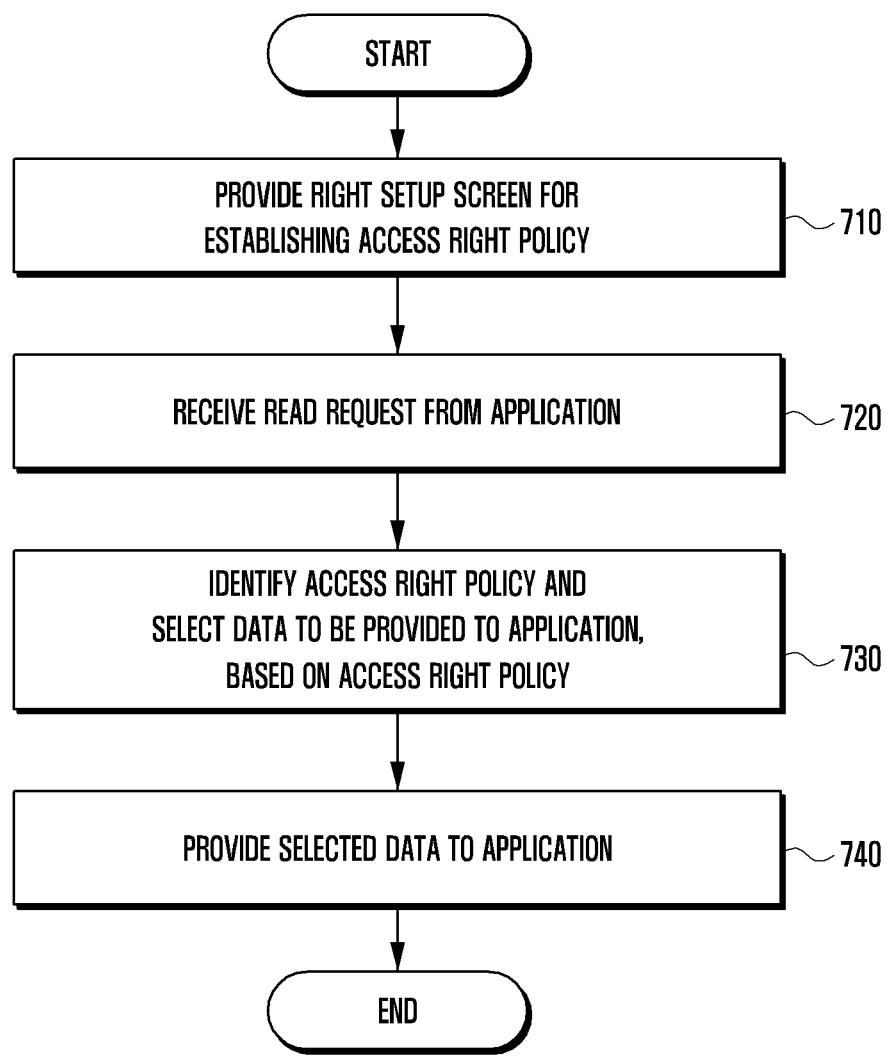
FIG. 7 is a flowchart illustrating example operations of a processor to provide a privacy service according to various embodiments.

FIG. 7 is a flowchart illustrating example operations of the processor 299 to provide a privacy service according to various embodiments.

In operation 710, the processor 299 may control the display 210 to provide a right setup screen that enables a user to select data that an application is allowed to access among data (e.g., the DB 230) stored in the memory 288. The processor 299 may establish an access right policy of a designated application by interacting with the user through the right setup screen and may store the established access right policy in the memory 288.

In operation 720, the processor 299 may receive a read request for the data stored in the memory 288 from the application. For example, the processor 299 may receive a read request for the entire SMS message from the message application 401a, the delivery service application 401b, the household account book application 401c, or the spam determination application 401d.

In operation 730, the processor 299 may identify an access right policy of the application making the read request in the memory 288 and may select data to be provided to the application making the read request from among the data stored in the memory 288, based on the identified access right policy.

In operation 740, the processor 299 may provide the selected data to the application making the read request.

Figure 8:
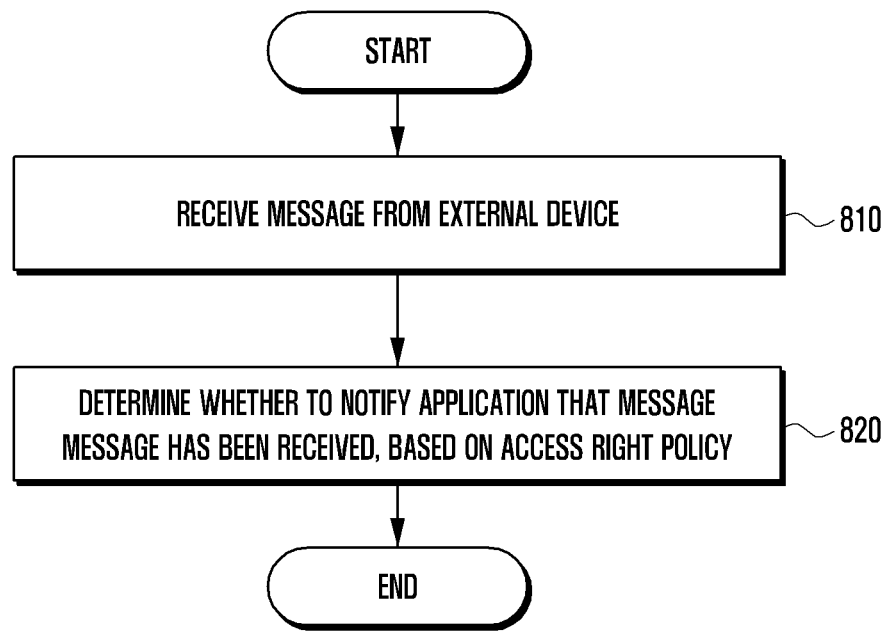
FIG. 8 is a flowchart illustrating example operations of a processor to provide a privacy service according to various embodiments.

FIG. 8 is a flowchart illustrating example operations of the processor 299 to provide a privacy service according to various embodiments.

In operation 810, the processor 299 may receive a message from an external device through, for example, a wireless communication circuit (e.g., the wireless communication module 192 of FIG. 1).

In operation 820, the processor 299 may determine whether to notify an application that the message has been received, based on an access right policy established for the application. For example, when information indicating a contact group to which contact information of the received message belongs is included in the access right policy, the processor 299 may determine not to notify the application that the message has been received. When a character string included in the received message is included in the access right policy, the processor 299 may determine to notify the application that the message has been received.

According to various example embodiments, an electronic device (e.g., the electronic device 200 of FIG. 2) may include: a touch-sensitive display; a processor operatively connected to the display; and a memory operatively connected to the processor, wherein the memory may store instructions that, when executed, cause the processor to: control the display to provide a right setup screen that enables a user to select data which an application is allowed to access among data stored in the memory, receive a read request for the data stored in the memory from the application, select data to be provided to the application among the data stored in the memory based on an access right policy established using the right setup screen, and provide the selected data to the application in response to the read request.

The instructions, when executed, may cause the processor to provide a contact group list through the display as part of an operation of providing the right setup screen, and establish the access right policy of blocking or allowing access of the application to a message received from contact information belonging to a group selected by the user from the contact group list and a message transmitted to contact information belonging to the selected group.

The instructions, when executed, may cause the processor to: receive a character string through the right setup screen, and establish the access right policy of blocking or allowing access of the application to a message including the character string.

The instructions, when executed, may cause the processor to: receive a character string through the right setup screen, and establish the policy of allowing access of the application to a message including the character string, changing the character string into a designated character string, and transmitting the message to the application.

The instructions, when executed, may cause the processor to: receive a message from an external device through a wireless communication circuit of the electronic device, and determine whether to notify the application that the message is received, based on the access right policy.

The instructions, when executed, may cause the processor to: determine to not notify the application that the message is received based on the access right policy including information indicating a contact group to which contact information of the message belongs.

The instructions, when executed, may cause the processor to: determine to notify the application that the message is received based on a character string designated in the access right policy being included in the message.

The electronic device may further include: a privacy manager module, a privacy service module, and a content providing module, each including various processing circuitry and/or executable program instructions that are stored in the memory and executed by the processor. The privacy manager module may be configured to provide the right setup screen to the display, establish the access right policy of the application by interacting with the user through the right setup screen, and provide the established access right policy to the privacy service module. The privacy service module may be configured to transmit the access right policy of the application to the content providing module upon receiving identification information about the application from the content providing module. The content providing module may be configured to select the data to be provided to the application among the data stored in the memory, based on the access right policy of the application received from the privacy service module, and provide the selected data to the application in response to the read request of the application.

The privacy manager module may be configured to establish the access right policy of blocking access of the application to a message received from contact information belonging to a group selected by the user from the contact group list provided through the right setup screen and a message transmitted to contact information belonging to the selected group.

The privacy manager module may be configured to establish the access right policy of allowing access of the application to a message received from contact information belonging to a group selected by the user from the contact group list provided through the right setup screen and a message transmitted to contact information belonging to the selected group.

The privacy manager module may be configured to receive a character string through the right setup screen, and establish the access right policy of blocking access of the application to a message including the character string.

The privacy manager module may be configured to receive a character string through the right setup screen, and establish the access right policy of allowing access of the application to a message including the character string.

The electronic device may further include a broadcast queue module including various processing circuitry and/or executable program instructions stored in the memory and executed by the processor. The broadcast queue module may be configured to request a list of applications designated to be allowed to access a message from the privacy service module based on recognizing that the message is newly stored in the memory, and notify an application included in the list of applications received from the privacy service module that the message is received. The privacy service module may be configured to make a list of applications to receive a notification of the message and to transmit the list to the broadcast queue module, based on an access right policy established for each application.

The privacy service module may be configured to identify a contact group to which contact information of the message belongs, and include an application having an access right policy including information indicating the contact group from the list of applications to be transmitted to the broadcast queue module.

The broadcast queue module may be configured to identify that a designated character string is included in the message, and include an application having an access right policy including the character string in the list of applications to be transmitted to the broadcast queue module.

According to various example embodiments, a method for operating an electronic device may include: providing a right setup screen that enables a user to select data which an application is allowed to access among data stored in a memory of the electronic device through a display of the electronic device, receiving a read request for the data stored in the memory from the application, selecting data to be provided to the application among the data stored in the memory based on an access right policy established using the right setup screen, and providing the selected data to the application in response to the read request.

According to various example embodiments, a non-transitory computer-readable recording medium may store instructions readable by a processor of an electronic device, wherein the instructions may, when executed by the processor, cause the processor to perform operations comprising: controlling a display to display a right setup screen that enables a user to select data which an application is allowed to access among data stored in a memory of the electronic device; receiving a read request for the data stored in the memory from the application; selecting data to be provided to the application among the data stored in the memory based on an access right policy established using the right setup screen; and an operation of providing the selected data to the application in response to the read request.

Embodiments of the disclosure disclosed herein and drawings merely to provide various examples to easily describe the technical details according to various example embodiments of the disclosure and to aid in understanding of the disclosure, and are not intended to limit the scope of the disclosure. Therefore, the scope of the disclosure should be understood to include all changes or modifications derived based on the technical idea of the disclosure. Any of the embodiment(s) described herein may be used in conjunction with any other embodiment(s) described herein.

What is claimed is:

1. An electronic device comprising:
a display;
at least one processor operatively connected to the display; and
memory operatively connected to the at least one processor,
wherein the memory stores instructions that, when executed by the at least one processor, cause the electronic device to:
display an access rights setup screen on the display for enabling configuration of an access rights policy for blocking or allowing access of an application to messages stored in the memory based on the messages including contact information contained in a contact group list selected through the access rights setup screen,
receive a read request for messages stored in the memory from the application,
select messages to be provided to the application among the messages stored in the memory based on the access rights policy, and
provide the selected messages to the application in response to the read request.

2. The electronic device of claim 1, wherein the instructions, when executed, cause the electronic device to:
receive a character string through the access rights setup screen, and
configure the access rights policy to block or allow access of the application to a message comprising the character string.

3. The electronic device of claim 1, wherein the instructions, when executed, cause the electronic device to:
receive a character string through the access rights setup screen, and
configure the access rights policy to allow the application to access a message comprising the character string, change the character string into a designated character string, and provide the message to the application.

4. The electronic device of claim 1, further comprising a communication circuit, and
wherein the instructions, when executed, cause the electronic device to:
receive a message from an external device through the communication circuit, and
determine whether to notify the application that the message is received based on the access rights policy.

5. The electronic device of claim 4, wherein the instructions, when executed, cause the electronic device to determine to not notify the application that the message is received based on the message including contact information contained in a contact group list configured in the access rights policy.

6. The electronic device of claim 4, wherein the instructions, when executed, cause the electronic device to determine to notify the application that the message is received based on the access rights policy being configured to include a character string included in the message.

7. The electronic device of claim 1, further comprising a privacy manager module, a privacy service module, and a content providing module stored in the memory and configured to be executed by the processor,
wherein the privacy manager module is configured to display the access rights setup screen, configure the access rights policy of the application based on user interaction through the access rights setup screen, and provide the configured access right policy to the privacy service module,
wherein the privacy service module is configured to provide the access rights policy of the application to the content providing module upon receiving identification information about the application from the content providing module, and
wherein the content providing module is configured to select the messages to be provided to the application among the messages stored in the memory based on the access right policy of the application received from the privacy service module, and provide the selected messages to the application in response to the read request of the application.

8. The electronic device of claim 7, wherein the privacy manager module is configured to configure the access right policy to block the application from accessing a received message including contact information contained in a contact group selected from the contact group list provided through the access rights setup screen and a transmitted message including contact information contained in a contact group selected from the contact group list provided through the access rights setup screen.

9. The electronic device of claim 7, the privacy manager module is configured to configure the access right policy to allow the application to access a received message including contact information contained in a contact group selected from the contact group list provided through the access rights setup screen and a transmitted message including contact information contained in a contact group selected from the contact group list provided through the access rights setup screen.

10. The electronic device of claim 7, wherein the privacy manager module is configured to:
receive a character string through the access rights setup screen, and
configure the access right policy to block the application from accessing a message comprising the character string.

11. The electronic device of claim 7, wherein the privacy manager module is configured to:
receive a character string through the access rights setup screen, and
configure the access right policy to allow the application to access a message comprising the character string.

12. The electronic device of claim 7, further comprising a broadcast queue module stored in the memory and configured to be executed by the processor,
wherein the broadcast queue module is configured to: request a list of one or more applications allowed to access a message from the privacy service module based on the message being newly stored in the memory, and notify applications included in the list of applications received from the privacy service module that the message is received, and wherein the privacy service module is configured to generate a list of applications to receive a notification of the message and to transmit the list to the broadcast queue module based on an access rights policy established for each respective application.

13. The electronic device of claim 12, wherein the privacy service module is configured to:

identify a contact group to which contact information of the message belongs, and include an application having an access rights policy including information indicating the contact group from the list of applications to be transmitted to the broadcast queue module.

14. The electronic device of claim 12, wherein the broadcast queue module is configured to:

identify that a designated character string is included in the message, and include an application having an access rights policy comprising the character string in the list of applications to be transmitted to the broadcast queue module.

15. A method of operating an electronic device, the method comprising:

displaying an access rights setup screen for enabling configuration of an access rights policy for blocking or allowing access of an application to stored messages based on the messages including contact information contained in a contact group list selected through the access rights setup screen;

receiving a read request for stored messages from the application;

selecting messages to be provided to the application among the stored messages based on the access rights policy; and providing the selected messages to the application in response to the read request.

16. A non-transitory computer-readable recording medium storing instructions executable by at least one processor of an electronic device, the instructions, when executed by the at least one processor, causing the electronic device to perform operations comprising:

controlling a display to display an access right setup screen for enabling configuration of an access rights policy for blocking or allowing access of an application to stored messages based on the messages including contact information contained in a contact group list selected through the access rights setup screen;

receiving a read request for messages stored in a memory from the application;

selecting messages to be provided to the application among the messages stored in the memory based on the access rights policy; and providing the selected messages to the application in response to the read request.

* * * * *